United States Patent
Naraki et al.

(10) Patent No.: US 11,708,427 B2
(45) Date of Patent: Jul. 25, 2023

(54) APPARATUS AND METHOD FOR MANUFACTURING HIGH-PRESSURE METHOD LOW-DENSITY POLYETHYLENE

(71) Applicant: Sumitomo Chemical Company, Limited, Tokyo (JP)

(72) Inventors: Kensuke Naraki, Ichihara (JP); Taiki Sugamura, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 17/532,997

(22) Filed: Nov. 22, 2021

(65) Prior Publication Data

US 2022/0169755 A1 Jun. 2, 2022

(51) Int. Cl.
   *C08F 2/34* (2006.01)
   *C08F 2/38* (2006.01)

(52) U.S. Cl.
   CPC . *C08F 2/34* (2013.01); *C08F 2/38* (2013.01)

(58) Field of Classification Search
   USPC ..................................................... 526/64, 68
   See application file for complete search history.

(56) References Cited

U.S. PATENT DOCUMENTS

| 3,577,224 A | * | 5/1971 | Hess | ........................... B01J 3/04 |
| | | | | 526/86 |
| 7,737,229 B2 | * | 6/2010 | Gonioukh | ............... C08F 10/00 |
| | | | | 526/64 |
| 2018/0155457 A1 | * | 6/2018 | Berbee | .................... C08F 6/001 |

FOREIGN PATENT DOCUMENTS

| JP | S4937434 B1 | 10/1974 |
| JP | S5164587 A | 6/1976 |
| JP | S5415317 B2 | 6/1979 |

OTHER PUBLICATIONS

Bell, S. L., "Low Density Polyethylene," SRI Consulting, Report No. 36D, 3 pages (2005).

* cited by examiner

*Primary Examiner* — Fred M Teskin
(74) *Attorney, Agent, or Firm* — Panitch Schwarze Belisario & Nadel LLP

(57) ABSTRACT

Provided are an apparatus and a method for manufacturing high-pressure method low-density polyethylene, the apparatus and the method having excellent characteristics that a chain transfer agent can be supplied by a simpler apparatus, a deviation (variation) of the concentration of the chain transfer agent supplied to a reactor can be reduced, and compression energy of the chain transfer agent can be reduced. An apparatus for manufacturing high-pressure method polyethylene includes a chain transfer agent supply line that is a line connected to a low pressure recycle ethylene supply line for supplying a chain transfer agent.

8 Claims, 1 Drawing Sheet

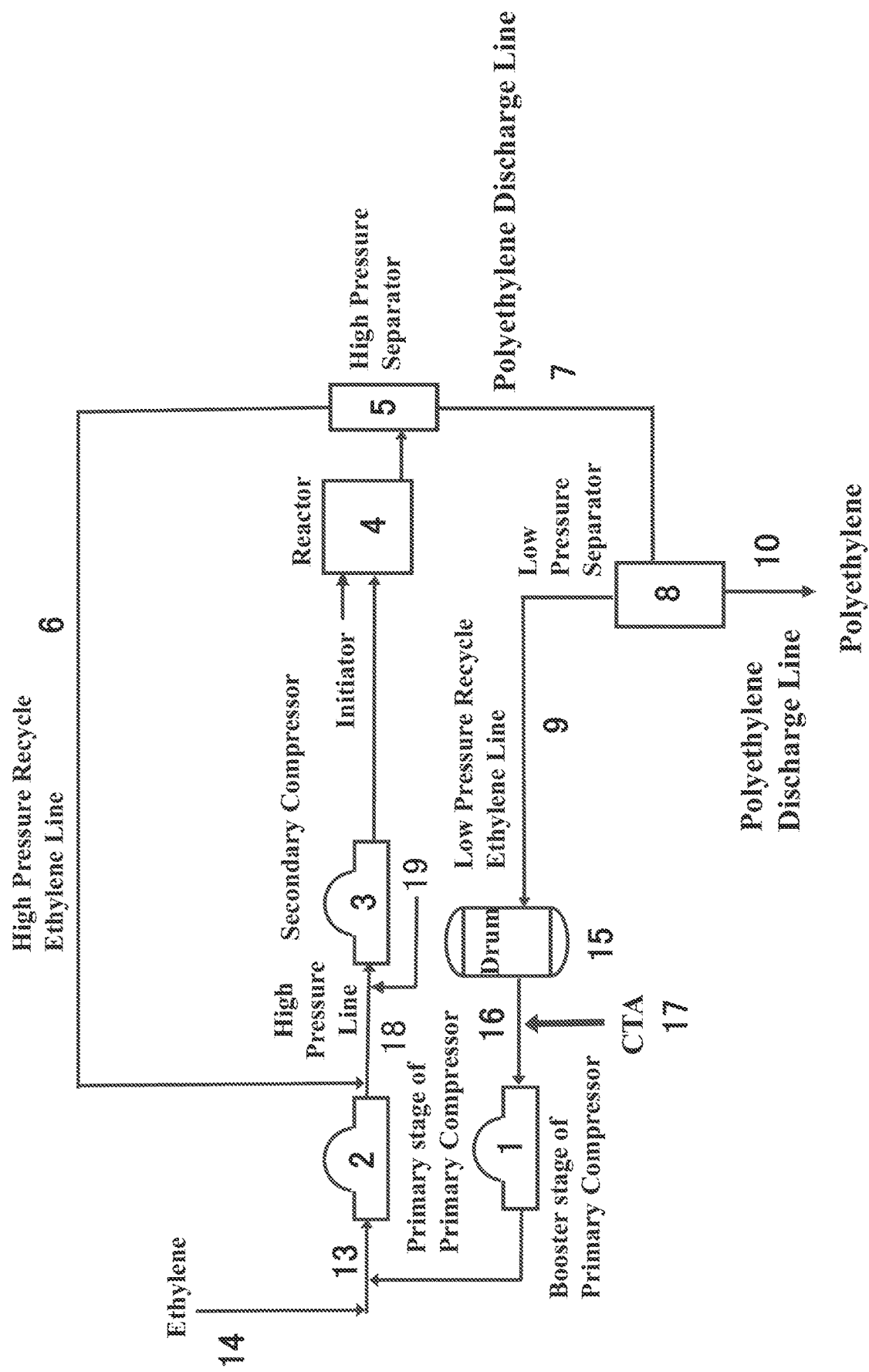

APPARATUS AND METHOD FOR MANUFACTURING HIGH-PRESSURE METHOD LOW-DENSITY POLYETHYLENE

CROSS-REFERENCE TO RELATED APPLICATIONS

This application claims priority under 35 U.S.C. § 119(b) to Japanese Application No. 2020-198197, filed Nov. 30, 2020, the disclosure of which is incorporated herein by reference in its entirety.

BACKGROUND OF THE INVENTION

Field of the Invention

The present invention relates to an apparatus and a method for manufacturing high-pressure method low-density polyethylene.

Description of the Related Art

An apparatus and a method for polymerizing ethylene at a high temperature and a high pressure in the presence of a polymerization initiator to obtain an ethylene polymer are known (for example, JP-A-49-37434, JP-A-54-15317, and SRI Consulting Report No. 36D, LOW DENSITY POLYETHYLENE by SUSAN L. BELL, September 2005). In such a high pressure polymerization method, in order to adjust the chain length of an ethylene unit contained in the polymer, that is, in order to adjust the molecular weight of the polymer, a chain transfer agent is handled.

JP-B-49-37434 describes an apparatus and a method for manufacturing high pressure method polyethylene, the apparatus and the method each including a compressor, a reactor, a high pressure separator, a low pressure separator, and the like.

JP-B-54-15317 describes an apparatus and a method for manufacturing high pressure method polyethylene, the apparatus and the method each including a pre-stage compressor, a mid-stage compressor, a post-stage compressor, a reactor, a high pressure separator, a low pressure separator, and the like.

SRI Consulting Report No. 36D, LOW DENSITY POLYETHYLENE by SUSAN L. BELL, September 2005 describes, on pages 5-11 and 6-4, an apparatus for manufacturing high-pressure method low-density polyethylene, the apparatus including a booster compressor, a primary compressor, a hyper compressor, a tubular reactor or an autoclave reactor, a high pressure separator, a low pressure separator, and the like.

SUMMARY OF THE INVENTION

Under such circumstances, a problem to be solved by the present invention is to provide an apparatus and a method for manufacturing high-pressure method low-density polyethylene, the apparatus and the method having excellent characteristics that in ethylene high pressure polymerization (ethylene high pressure polymerization here includes not only homopolymerization of ethylene but also copolymerization), a chain transfer agent can be handled more efficiently, specifically, the chain transfer agent can be supplied by a simpler apparatus, a deviation (variation) of the concentration of the chain transfer agent supplied to a reactor can be reduced, and compression energy of the chain transfer agent can be reduced.

The present inventor has made intensive studies in view of such a background, and has completed the present invention.

That is, the present invention is as follows.

[1]
An apparatus for manufacturing high-pressure method polyethylene, the apparatus including
a chain transfer agent (CTA) supply line (17) that is a line connected to a low pressure recycle ethylene supply line (16) for supplying a chain transfer agent (CTA).

Hereinafter, [2] to [10] are preferred aspects or embodiments of the present invention.

[2]
The manufacturing apparatus according to [1], in which the chain transfer agent (CTA) supply line (17) is a line connected to the low pressure recycle ethylene supply line (16) for supplying a chain transfer agent (CTA), and the inside of the chain transfer agent (CTA) supply line (17) is controlled to a pressure of 0.01 to 0.1 MPa and a temperature of 10 to 60° C.

[3]
The manufacturing apparatus according to [1] or [2], further including:
a recycle ethylene holding drum (15) that is a drum for holding low pressure recycle ethylene supplied through a low pressure recycle ethylene line (9); and
a low pressure recycle ethylene supply line (16) that is a line for connecting the recycle ethylene holding drum (15) to a booster stage of primary compressor (1) and supplying low pressure recycle ethylene from the recycle ethylene holding drum (15) to the booster stage of primary compressor (1).

[4]
The manufacturing apparatus according to [3], further including:
a booster stage of primary compressor (1) that is a compressor that compresses ethylene;
a primary stage of primary compressor (2) that is a compressor that further compresses ethylene supplied from the booster stage of primary compressor (1);
a secondary compressor (3) that is a compressor that further compresses ethylene supplied from the primary stage of primary compressor (2);
a reactor (4) that is a reactor that polymerizes ethylene using ethylene supplied from the secondary compressor (3) and a polymerization initiator supplied to the reactor (4) to manufacture polyethylene;
a high pressure separator (5) that is a high pressure separator to which polyethylene obtained in the reactor (4) and recycle ethylene are supplied from the reactor (4) and which separates the polyethylene and the high pressure recycle ethylene from each other;
a high pressure recycle ethylene line (6) that is a line for supplying high pressure recycle ethylene separated by the high pressure separator (5) to the secondary compressor (3);
a polyethylene discharge line (7) that is a line for discharging polyethylene separated by the high pressure separator (5) from the high pressure separator (5) and supplying the polyethylene to a low pressure separator (8);
the low pressure separator (8) that is a separator that separates low pressure recycle ethylene contained in polyethylene separated by the high pressure separator (5) and supplied through the polyethylene discharge line (7) from the polyethylene;

a low pressure recycle ethylene line (9) that is a line for supplying low pressure recycle ethylene separated by the low pressure separator (8) to the recycle ethylene holding drum (15); and a polyethylene discharge line (10) that is a line for discharging polyethylene separated by the low pressure separator (8).

[5]

The manufacturing apparatus according to [3] or [4], further including:

an ethylene supply line (13) that is a line for connecting the booster stage of primary compressor (1) to the primary stage of primary compressor (2) and supplying compressed recycle ethylene from the booster stage of primary compressor (1) to the primary stage of primary compressor (2), and merging with an ethylene supply line (14); and the ethylene supply line (14) that is a line connected to the ethylene supply line (13) for supplying ethylene.

[6]

A method for manufacturing high-pressure method polyethylene, the method including:

a low pressure recycle ethylene recycling step of supplying low pressure recycle ethylene separated by a low pressure separator (8) to a recycle ethylene holding drum (15) through a low pressure recycle ethylene line (9); and a chain transfer agent (CTA) supply step of supplying a chain transfer agent (CTA) from a chain transfer agent (CTA) supply line (17) to a low pressure recycle ethylene supply line (16).

[7]

The manufacturing method according to [6], in which the low pressure recycle ethylene recycling step is a step of supplying low pressure recycle ethylene at a pressure of 0.01 to 0.1 MPa and a temperature of 150 to 220° C. separated by the low pressure separator (8) to the recycle ethylene holding drum (15) through the low pressure recycle ethylene line (9), and the chain transfer agent (CTA) supply step is a step of supplying a chain transfer agent (CTA) from the chain transfer agent (CTA) supply line (17), the inside of which is controlled to a pressure of 0.01 to 0.1 MPa and a temperature of 10 to 60° C., to the low pressure recycle ethylene supply line (16), the inside of which is controlled to a pressure of 0.01 to 0.1 MPa and a temperature of 10 to 60° C.

[8]

The manufacturing method according to [6] or [7], further including:

a compression step of compressing ethylene;

a reaction step of supplying compressed ethylene and a polymerization initiator to a reactor (4) to polymerize ethylene to generate polyethylene;

a separation step of separating polyethylene generated in the reactor (4) and recycle ethylene from each other by the high pressure separator (5), discharging the generated polyethylene from the high pressure separator (5), supplying the polyethylene to a low pressure separator (8) through a discharge line (7), separating recycle ethylene contained in polyethylene from the polyethylene by the low pressure separator (8), and discharging the polyethylene;

a low pressure recycle ethylene recycling step of supplying the low pressure recycle ethylene separated by the low pressure separator (8) to a booster stage of primary compressor (1) through a low pressure recycle ethylene line (9); and an ethylene supply step of supplying ethylene from an ethylene supply line (14) to an ethylene supply line (13).

[9]

The manufacturing method according to [8], in which the compression step is a step of compressing ethylene to a pressure within a range of 0.04 MPa to 3 MPa by the booster stage of primary compressor (1), compressing ethylene compressed by the booster stage of primary compressor (1) to a pressure within a range of 3 MPa to 20 MPa by the primary stage of primary compressor (2), and compressing ethylene compressed by the primary stage of primary compressor (2) to a pressure within a range of 20 MPa to 200 MPa by the secondary compressor (3).

[10]

The manufacturing method according to any one of [6] to [9], in which an apparatus for manufacturing high pressure method polyethylene is used.

The present invention can provide an apparatus and a method for manufacturing high-pressure method low-density polyethylene, the apparatus and the method having excellent characteristics that a chain transfer agent can be supplied by a simpler apparatus, a deviation (variation) of the concentration of the chain transfer agent supplied to a reactor can be reduced, and compression energy of the chain transfer agent can be reduced.

BRIEF DESCRIPTION OF THE DRAWINGS

The FIGURE illustrates a schematic process diagram of an apparatus and a method for manufacturing high-pressure method low-density polyethylene according to an embodiment of the present invention.

DETAILED DESCRIPTION OF THE PREFERRED EMBODIMENTS

A manufacturing apparatus and a manufacturing method according to an embodiment of the present invention will be described in detail below with reference to the FIGURE.

Ethylene gas is supplied from a primary stage of primary compressor (2) to a secondary compressor (3) through a high pressure ethylene line (18), vinyl acetate (19) (comonomer; not illustrated) is supplied to the high pressure ethylene line (18) to supply vinyl acetate to a polymerization reactor (4), and t-butylperoxy-2-ethylhexanoate is added thereto as a polymerization initiator to polymerize ethylene and vinyl acetate (19).

A polymerization mixture is discharged from the polymerization reactor (4) to a high pressure separator (5) and separated into a generated polymer and recycle ethylene gas.

The generated polymer separated by the high pressure separator (5) is discharged into a low pressure separator (8) through a polyethylene discharge line (7), and further separated into an ethylene-vinyl acetate copolymer and recycle ethylene gas. The ethylene-vinyl acetate copolymer is discharged through a polyethylene discharge line (10) and pelletized by a granulator.

The recycle ethylene gas separated by the low pressure separator (8) is supplied to a recycle ethylene holding drum (15) through a low pressure recycle ethylene line (9). The recycle ethylene gas held by the recycle ethylene holding drum (15) is supplied to a booster stage of primary compressor (1) through an ethylene line (16), and propane is supplied to the ethylene line (16) as a chain transfer agent (CTA) to supply propane to the booster stage of primary compressor (1).

The recycle ethylene gas and propane are compressed in the booster stage of primary compressor (1) and supplied to the primary stage of primary compressor (2) through an ethylene line (13).

The entire amount (100 weight percent) of the recycle ethylene gas separated by the high pressure separator (5) is supplied to an inlet line of the secondary compressor (3) through a high pressure recycle ethylene line (6).

Ethylene gas is supplied from an ethylene supply line (14) to the primary stage of primary compressor (2) through the ethylene line (13).

Mixed ethylene gas of the recycle ethylene gas and propane supplied from the booster stage of primary compressor (1), and ethylene gas is compressed by the primary stage of primary compressor (2) and supplied to the secondary compressor (3).

Ethylene gas and propane compressed by the secondary compressor (3) are supplied to the polymerization reactor (4) to continuously perform the polymerization reaction.

<Manufacturing Apparatus>

A manufacturing apparatus according to an embodiment of the present invention is an apparatus for manufacturing high-pressure method polyethylene, the apparatus including a chain transfer agent (CTA) supply line (17) that is a line connected to a low pressure recycle ethylene supply line (16) for supplying a chain transfer agent (CTA).

Booster Stage of Primary Compressor (1)

The booster stage of primary compressor (1) is a compressor that compresses ethylene to a pressure within a range of, for example, 0.04 MPa to 3 MPa.

Primary Stage of Primary Compressor (2)

The primary stage of primary compressor (2) is a compressor that compresses ethylene supplied from the booster stage of primary compressor (1) to a pressure within a range of, for example, 3 MPa to 20 MPa.

Secondary Compressor (3)

The secondary compressor (3) is a compressor that compresses ethylene supplied from the primary stage of primary compressor (2) to a pressure within a range of, for example, 20 MPa to 200 MPa.

Reactor (4)

The reactor (4) is a reactor that polymerizes ethylene with ethylene supplied from the secondary compressor (3) and a polymerization initiator supplied to the reactor (4) to manufacture polyethylene.

The reactor (4) may be either a tubular reactor or a tank-like reactor. The ethylene high pressure polymerization can be performed using a polymerization initiator such as oxygen or peroxide at a pressure of, for example, 20 MPa or more, preferably 100 to 500 MPa, more preferably 100 to 400 MPa, at a temperature of, for example, 100° C. or higher, preferably 100 to 400° C., more preferably 150 to 350° C., still more preferably 150 to 300° C.

An ethylene stream put into the reactor (4) can contain a comonomer and a chain transfer agent in addition to the polymerization initiator.

High Pressure Separator (5)

The high pressure separator (5) is a high pressure separator to which polyethylene obtained in the reactor (4) and recycle ethylene are supplied under reduced pressure from the reactor (4), and which separates the polyethylene and the high pressure recycle ethylene from each other A reaction generation mixture including a polymer generated in the reactor (4), recycle ethylene gas, a polymerization by-product, a solvent, a lubricating oil, and the like optionally passes through a pressure regulating valve, enters the high pressure separator (5) and is released under reduced pressure, and a part of the polymer contained in the reaction generation mixture is separated at a pressure of, for example, 10 to 100 MPa, preferably 50 to 100 MPa, more preferably 70 MPa or less, for example, at a temperature of 200 to 260° C.

The separated polymer contains almost no low-molecular-weight product having a weight average molecular weight of 5000 or less.

The polymer separated by the high pressure separator (5) is sent to the low pressure separator (8), recycle ethylene gas remaining in the polymer is separated and removed, and then the polymer from which the recycle ethylene gas has been removed is taken out as a product polyethylene from the polyethylene discharge line (10).

High Pressure Recycle Ethylene Line (6)

The high pressure recycle ethylene line (6) is a line for supplying high pressure recycle ethylene separated by the high pressure separator (5) to the secondary compressor (3).

Polyethylene Discharge Line (7)

The polyethylene discharge line (7) is a line for discharging polyethylene separated by the high pressure separator (5) from the high pressure separator (5) and supplying the polyethylene to the low pressure separator (8).

Low Pressure Separator (8)

The low pressure separator (8) is a separator that separates low pressure recycle ethylene contained in polyethylene separated by the high pressure separator (5) and supplied through the polyethylene discharge line (7) from the polyethylene.

Recycle gas separated into a head of the low pressure separator (8) by the low pressure separator (8) and having a temperature of, for example, about 200 to 250° C. is cooled to, for example, 20 to 50° C. by a cooler, and then sent to, for example, a separator, and impurities such as a solvent are removed from the recycle gas. Recycle gas ethylene from which impurities have been removed is returned to an inlet of the booster stage of primary compressor (1) through the low pressure recycle ethylene line (9).

Low Pressure Recycle Ethylene Line (9)

The low pressure recycle ethylene line (9) is a line for supplying low pressure recycle ethylene separated by the low pressure separator (8) to the booster stage of primary compressor (1). The inside of the low pressure recycle ethylene line (9) can be controlled to a pressure of, for example, 0.01 to 0.1 MPa and a temperature of, for example, 150 to 220° C.

Polyethylene Discharge Line (10)

The polyethylene discharge line (10) is a line for discharging polyethylene separated by the low pressure separator (8). Polyethylene discharged from the polyethylene discharge line (10) can be processed into a pellet product through an extruder, a cooler, a granulator, and the like. Polyethylene to be obtained can be low density polyethylene, for example, having a density of 910 to 920 kg/m$^3$.

Ethylene Supply Line (13)

The ethylene supply line (13) is a line for connecting the booster stage of primary compressor (1) to the primary stage of primary compressor (2) and supplying recycle ethylene compressed to, for example, a pressure of 0.04 MPa to 3 MPa from the booster stage of primary compressor (1) to the primary stage of primary compressor (2), and merging with the ethylene supply line (14).

Ethylene Supply Line (14)

The ethylene supply line (14) is a line connected to the ethylene supply line (13) for supplying ethylene. For example, ethylene gas at 0.8 MPa to 3 MPa is supplied.

As an embodiment, a raw material ethylene gas is sent from the ethylene supply line (14) to the primary stage of primary compressor (2), compressed to, for example, a pressure within a range of 3 MPa to 20 MPa, and then further compressed to, for example, a pressure within a range of 20 MPa to 200 MPa by the secondary compressor (3). Gas pressurized to a polymerization pressure is sent to the reactor (4) and polymerized using oxygen or a peroxide initiator at a predetermined temperature of, for example, 150 to 300° C.

Recycle Ethylene Holding Drum (15)

The recycle ethylene holding drum (15) is a drum that holds low pressure recycle ethylene supplied through the low pressure recycle ethylene line (9) at a pressure of, for example, 0.01 to 0.1 MPa and a temperature of, for example, 10 to 60° C.

Low Pressure Recycle Ethylene Supply Line (16)

The low pressure recycle ethylene supply line (16) is a line for connecting the recycle ethylene holding drum (15) to the booster stage of primary compressor (1) and supplying low pressure recycle ethylene from the recycle ethylene holding drum (15) to the booster stage of primary compressor (1). The inside of the low pressure recycle ethylene supply line (16) can be controlled to a pressure of, for example, 0.01 to 0.1 MPa and a temperature of, for example, 10 to 60° C.

Chain transfer agent (CTA) supply line (17) The chain transfer agent (CTA) supply line (17) is a line connected to the low pressure recycle ethylene supply line (16) for supplying a chain transfer agent (CTA). The inside of the chain transfer agent (CTA) supply line (17) can be controlled to a pressure of, for example, 0.01 to 0.1 MPa and a temperature of, for example, 10 to 60° C.

High Pressure Ethylene Line (18)

The high pressure ethylene line (18) is a line that connects the primary stage of primary compressor (2) to the secondary compressor (3), and is a line for supplying high pressure recycle ethylene separated by the high pressure separator (5) from the high pressure recycle ethylene line (6) to the secondary compressor (3) and for supplying ethylene from the primary stage of primary compressor (2) to the secondary compressor (3). The inside of the high pressure ethylene line (18) can be controlled to a pressure of, for example, 10 to 20 MPa and a temperature of, for example, 10 to 60° C.

<Manufacturing Method>

A manufacturing method according to an embodiment of the present invention is a method for manufacturing high-pressure method polyethylene, the method including:

a low pressure recycle ethylene recycling step of supplying low pressure recycle ethylene separated by a low pressure separator (8) to a recycle ethylene holding drum (15) through a low pressure recycle ethylene line (9); and a chain transfer agent (CTA) supply step of supplying a chain transfer agent (CTA) from a chain transfer agent (CTA) supply line (17) to a low pressure recycle ethylene supply line (16).

Compression Step

A compression step is not limited to one stage, and may include a step of performing compression in two or more stages.

For example, the compression step is a step of compressing ethylene to a pressure within a range of 0.04 MPa to 3 MPa by the booster stage of primary compressor (1), compressing ethylene compressed by the booster stage of primary compressor (1) to a pressure within a range of 3 MPa to 20 MPa by the primary stage of primary compressor (2), and compressing ethylene compressed by the primary stage of primary compressor (2) to a pressure within a range of 20 MPa to 200 MPa by the secondary compressor (3).

Reaction Step

A reaction step is a step of supplying ethylene compressed by the secondary compressor (3) and a polymerization initiator to the reactor (4) to polymerize ethylene to generate polyethylene.

As detailed operating conditions of the reaction step, the conditions described in the above description of the reactor (4) can be applied.

Separation Step

A separation step is a step of separating polyethylene generated in the reactor (4) and recycle ethylene from each other by the high pressure separator (5), discharging the generated polyethylene from the high pressure separator (5) and supplying the polyethylene to the low pressure separator (8) through the discharge line (7), and separating recycle ethylene contained in polyethylene from the polyethylene by the low pressure separator (8), and discharging the polyethylene.

As detailed operating conditions of the separation step in the high pressure separator (5) and the low pressure separator (8), the conditions described in the above description of the high pressure separator (5) and the low pressure separator (8) can be applied.

High Pressure Recycle Ethylene Recycling Step

The high pressure recycle ethylene recycling step is a step of supplying recycle ethylene separated by the high pressure separator (5) to the secondary compressor (3) through the high pressure recycle ethylene line (6).

As detailed operating conditions of the high pressure recycle ethylene recycling step, the conditions described in the above description of the high pressure recycle ethylene line (6) can be applied.

Low Pressure Recycle Ethylene Recycling Step

The low pressure recycle ethylene recycling step is a step of supplying low pressure recycle ethylene separated by the low pressure separator (8) to the recycle ethylene holding drum (15) through the low pressure recycle ethylene line (9).

As detailed operating conditions of the low pressure recycle ethylene recycling step, the conditions described in the above description of the low pressure separator (8), the low pressure recycle ethylene line (9), and the recycle ethylene holding drum (15) can be applied.

Chain Transfer Agent (CTA) Supply Step

The chain transfer agent (CTA) supply step is a step of supplying a chain transfer agent (CTA) from the chain transfer agent (CTA) supply line (17) to the low pressure recycle ethylene supply line (16).

As detailed operating conditions of the chain transfer agent (CTA) supply step, the conditions described in the above description of the chain transfer agent (CTA) supply line (17) and the low pressure recycle ethylene supply line (16) can be applied.

Ethylene Supply Step

An ethylene supply step is a step of
supplying ethylene from the ethylene supply line (14) to the ethylene supply line (13), and
supplying the ethylene to the primary stage of primary compressor (2) through the ethylene supply line (13).

As detailed operating conditions of the ethylene supply step, the conditions described in the above description of the ethylene supply line (14) and the ethylene supply line (13) can be applied.

The present invention can be performed using a high pressure ethylene polymerization apparatus including a high pressure circulating gas system.

In the present invention, all polymerization initiators and chain transfer agents known to be used for polymerization or copolymerization of ethylene can be used.

<Polymerization Initiator>

In the present invention, all polymerization initiators known to be used for polymerization or copolymerization of ethylene can be used.

Suitable examples of the polymerization initiator include hydrogen peroxide, an organic peroxide such as lauroyl peroxide, dipropionyl peroxide, benzoyl peroxide, di-tertiary-butyl peroxide, tertiary-butyl hydroperoxide, trimethylhexanoyl peroxide, diisopropylperoxydicarbonate, tertiary-butyl peracetate, or tertiary-butyl perisobutyrate, molecular oxygen, an azo compound such as azobisisobutyronitrile or azoisobutylvaleronitrile, t-butyl peroxybenzoate, t-butyl peroxy-2 ethylhexanoate, t-butyl peroxyisopropyl carbonate, and oxygen.

<Chain Transfer Agent>

In the present invention, all chain transfer agents known to be used for polymerization or copolymerization of ethylene can be used.

Suitable examples of the chain transfer agent include a paraffin hydrocarbon such as ethane, propane, butane, heptane, hexane, or pentane; an α-olefin such as propylene, butene-1, hexene-1, or 3-methylbutene-1; an aldehyde such as formaldehyde, acetaldehyde, propylene aldehyde, or n-butyraldehyde; a ketone such as acetone, methyl ethyl ketone, diethyl ketone, diisopropyl ketone, cyclohexanone, or methyl isopropyl ketone; an aromatic hydrocarbon; and a chlorinated hydrocarbon.

<Comonomer>

The apparatus and the method according to an embodiment of the present invention can also be applied to copolymerization of ethylene and another comonomer that can be copolymerized with ethylene.

In the present invention, for example, all comonomers known to be copolymerized with ethylene, such as a compound having an ethylenically unsaturated group, including acrylic acid, methacrylic acid, and alkyl esters thereof, acrylonitrile, methacrylonitrile, acrylamide, methacrylamide, vinyl chloride, vinylidine chloride, vinyl fluoride, vinyl acetate, vinyl propionate, an N-vinylimide compound, a vinyl aryl compound, a vinyl ether compound, a vinyl ketone compound, and the like, can be used.

The comonomer can be used so as to be contained in a copolymer to be obtained in an amount of more than 0% by weight and about 50% by weight or less, preferably about 40% by weight or less, more preferably about 30% by weight or less, still more preferably about 20% by weight or less.

The comonomer can be added to any unit and step. The comonomer can be added to, for example, a unit and a step from a periphery of the compressor to a periphery of the reactor.

EXAMPLES

Example 1

Ethylene gas was supplied from the primary stage of primary compressor (2) to the secondary compressor (3) through the high pressure ethylene line (18) at 14,400 kg/Hr, vinyl acetate (19) (comonomer; not illustrated) was supplied to the high pressure ethylene line (18) to supply vinyl acetate to the polymerization reactor (4) at 560 kg/Hr, and t-butylperoxy-2-ethylhexanoate was added thereto as a polymerization initiator to polymerize ethylene and vinyl acetate (19) at a pressure of 191 MPa and a temperature of 210° C. A polymer generating rate was 2,400 kg/Hr.

A polymerization mixture was released from the polymerization reactor (4) to the high pressure separator (5) at 21.3 MPa and separated into a generated polymer and recycle ethylene gas at 238° C.

The generated polymer separated by the high pressure separator (5) was discharged into the low pressure separator (8) at 0.042 MPa through the polyethylene discharge line (7), and further separated into an ethylene-vinyl acetate copolymer and recycle ethylene gas at 204° C.

The ethylene-vinyl acetate copolymer was discharged through the polyethylene discharge line (10) and pelletized by a granulator.

The recycle ethylene gas separated by the low pressure separator (8) was supplied to the recycle ethylene holding drum (15) at 0.040 MPa and a temperature of 33° C. through the low pressure recycle ethylene line (9). The recycle ethylene gas at 0.040 MPa held by the recycle ethylene holding drum (15) was supplied to the booster stage of primary compressor (1) through the low pressure recycle ethylene supply line (16), and propane was supplied to the low pressure recycle ethylene supply line (16) as a chain transfer agent (CTA) to supply propane to the booster stage of primary compressor (1) at 19.9 kg/Hr.

The recycle ethylene gas and propane were compressed to a pressure of 3.0 MPa in the booster stage of primary compressor (1) and supplied to the primary stage of primary compressor (2) through the ethylene line (13).

The entire amount (100 weight percent) of the recycle ethylene gas separated by the high pressure separator (5) was compressed to a pressure of 16.0 MPa through the high pressure recycle ethylene line (6) and supplied to an inlet line of the secondary compressor (3).

Ethylene gas at 3.0 MPa was supplied from the ethylene supply line (14) to the primary stage of primary compressor (2) through the ethylene line (13).

Mixed ethylene gas of the recycle ethylene gas and propane supplied from the booster stage of primary compressor (1), and ethylene gas was compressed by the primary stage of primary compressor (2) to a pressure of 16.7 MPa and supplied to the secondary compressor (3).

Ethylene gas and propane compressed to a pressure of 202 MPa by the secondary compressor (3) were supplied to the polymerization reactor (4) to continuously perform the polymerization reaction.

The concentration of each of vinyl acetate (comonomer) and propane (chain transfer agent) was measured about 200 times by gas chromatography installed in the high pressure ethylene line 18, and an average concentration and a standard deviation of the concentration were determined. Results thereof are indicated in Table 1.

TABLE 1

|  | Concentration (% by weight) | Standard deviation |
|---|---|---|
| Vinyl acetate | 13.99 | 0.32 |
| Propane | 1.30 | 0.10 |

It is found that propane supplied to a low pressure portion has a smaller standard deviation of the concentration and has a smaller variation in the concentration.

Example 2

Ethylene gas was supplied from the primary stage of primary compressor (2) to the secondary compressor (3) through the high pressure ethylene line (18) at 12,900 kg/Hr, vinyl acetate (19) (comonomer; not illustrated) was supplied to the high pressure ethylene line (18) to supply vinyl acetate to the polymerization reactor (4) at 167 kg/Hr, and t-butylperoxyisopropylcarbonate was added thereto as a polymerization initiator to polymerize ethylene and vinyl acetate (19) at a pressure of 151 MPa and a temperature of 238° C. A polymer generating rate was 2,500 kg/Hr.

A polymerization mixture was released from the polymerization reactor (4) to the high pressure separator (5) at 21.3 MPa and separated into a generated polymer and recycle ethylene gas at 241° C.

The generated polymer separated by the high pressure separator (5) was discharged into the low pressure separator (8) at 0.042 MPa through the polyethylene discharge line (7), and further separated into an ethylene-vinyl acetate copolymer and recycle ethylene gas at 208° C. The ethylene-vinyl acetate copolymer was discharged through the polyethylene discharge line (10) and pelletized by a granulator.

The recycle ethylene gas separated by the low pressure separator (8) was supplied to the recycle ethylene holding drum (15) at 0.040 MPa and a temperature of 32° C. through the low pressure recycle ethylene line (9). The recycle ethylene gas at 0.040 MPa held by the recycle ethylene holding drum (15) was supplied to the booster stage of primary compressor (1) through the low pressure recycle ethylene supply line (16), and propane was supplied to the low pressure recycle ethylene supply line (16) as a chain transfer agent (CTA) to supply propane to the booster stage of primary compressor (1) at 20.8 kg/Hr.

The recycle ethylene gas and propane were compressed to a pressure of 3.0 MPa in the booster stage of primary compressor (1) and supplied to the primary stage of primary compressor (2) through the ethylene line (13).

The entire amount (100 weight percent) of the recycle ethylene gas separated by the high pressure separator (5) was compressed to a pressure of 17.6 MPa through the high pressure recycle ethylene line (6) and supplied to an inlet line of the secondary compressor (3).

Ethylene gas at 3.0 MPa was supplied from the ethylene supply line (14) to the primary stage of primary compressor (2) through the ethylene line (13).

Mixed ethylene gas of the recycle ethylene gas and propane supplied from the booster stage of primary compressor (1), and ethylene gas was compressed by the primary stage of primary compressor (2) to a pressure of 18.7 MPa and supplied to the secondary compressor (3).

Ethylene gas and propane compressed to a pressure of 158.9 MPa by the secondary compressor (3) were supplied to the polymerization reactor (4) to continuously perform the polymerization reaction.

The concentration of each of vinyl acetate (comonomer) and propane (chain transfer agent) was measured about 300 times by gas chromatography installed in the high pressure ethylene line 18, and an average concentration and a standard deviation of the concentration were determined. Results thereof are indicated in Table 2.

TABLE 2

|  | Concentration (% by weight) | Standard deviation |
|---|---|---|
| Vinyl acetate | 4.39 | 0.058 |
| Propane | 2.01 | 0.030 |

It is found that propane supplied to a low pressure portion has a smaller standard deviation of the concentration and has a smaller variation in the concentration.

Physical Properties of Ethylene-Vinyl Acetate Copolymer

A melt flow rate and the vinyl acetate content of the ethylene-vinyl acetate copolymer discharged through the discharge line (10) and pelletized by a granulator are indicated in Table 3.

TABLE 3

|  | Example 1 | Example 2 |
|---|---|---|
| Melt flow rate (g/10 min) | 1.5 | 2.0 |
| Vinyl acetate content (% by weight) | 15 | 5 |

<Analysis and Measurement Method>

(1) The melt flow rate was measured in accordance with JIS K7210-1 under conditions of a temperature of 190±0.5° C. and a load of 2.16 kg±0.5%.

(2) The vinyl acetate content was measured by a saponification method in accordance with JIS K7192.

Calculation of Compression Energy

Using propane as a chain transfer agent (CTA), assuming that compression energy required to supply propane to the low pressure recycle ethylene supply line (16) was 0, compression energy required to supply propane to the ethylene line (13) and compression energy required to supply propane to the high pressure ethylene line (18) were calculated.

In order to supply propane to the ethylene line (13), compression energy required to compress propane at 0.004 MPa to a pressure of 3.0 MPa is 47.5 W/Kg, and 396 W/ton-PE per ton of the amount of PE generated.

In order to supply propane to the high pressure ethylene line (18), compression energy required to compress propane at 0.004 MPa to a pressure of 24 MPa is 92.9 W/Kg, and 774 W/ton-PE per ton of the amount of PE generated.

Therefore, it is found that the energy required for compression is less when propane is supplied to a low pressure portion.

From the above results, it has become clearer that it is advantageous to supply a chain transfer agent with a simpler apparatus (an apparatus sufficient at low pressure without requiring high pressure).

The apparatus and the method for manufacturing high-pressure method low-density polyethylene according to an embodiment of the present invention have excellent characteristics that in ethylene high pressure polymerization, a chain transfer agent can be supplied by a simpler apparatus, a deviation (variation) of the concentration of the chain transfer agent supplied to a reactor can be reduced, and compression energy of the chain transfer agent can be reduced. Therefore, polyethylene to be manufactured is suitably used for applications such as various films, various automobile interior and exterior parts, various parts of household electric appliances, various housing equipment parts, various industrial parts, and various building material parts, and have high applicability in various industrial fields such as household goods, transportation machine industry, electrical and electronic industry, and building and construction industry.

What is claimed is:

1. An apparatus for manufacturing high-pressure method polyethylene, the apparatus comprising
    a chain transfer agent (CTA) supply line (17) that is a line connected to a low pressure recycle ethylene supply line (16) for supplying a chain transfer agent (CTA);
    a recycle ethylene holding drum (15) that is a drum for holding low pressure recycle ethylene supplied through a low pressure recycle ethylene line (9); and
    a low pressure recycle ethylene supply line (16) that is a line for connecting the recycle ethylene holding drum (15) to a booster stage of primary compressor (1) and supplying low pressure recycle ethylene from the recycle ethylene holding drum (15) to the booster stage of primary compressor (1).

2. The manufacturing apparatus according to claim 1, further comprising:
    a booster stage of primary compressor (1) that is a compressor that compresses ethylene;
    a primary stage of primary compressor (2) that is a compressor that further compresses ethylene supplied from the booster stage of primary compressor (1);
    a secondary compressor (3) that is a compressor that further compresses ethylene supplied from the primary stage of primary compressor (2);
    a reactor (4) that is a reactor that polymerizes ethylene using ethylene supplied from the secondary compressor (3) and a polymerization initiator supplied to the reactor (4) to manufacture polyethylene;
    a high pressure separator (5) that is a high pressure separator to which polyethylene obtained in the reactor (4) and recycle ethylene are supplied from the reactor (4) and which separates the polyethylene and the high pressure recycle ethylene from each other;
    a high pressure recycle ethylene line (6) that is a line for supplying high pressure recycle ethylene separated by the high pressure separator (5) to the secondary compressor (3);
    a polyethylene discharge line (7) that is a line for discharging polyethylene separated by the high pressure separator (5) from the high pressure separator (5) and supplying the polyethylene to a low pressure separator (8);
    the low pressure separator (8) that is a separator that separates low pressure recycle ethylene contained in polyethylene separated by the high pressure separator (5) and supplied through the polyethylene discharge line (7) from the polyethylene;
    a low pressure recycle ethylene line (9) that is a line for supplying low pressure recycle ethylene separated by the low pressure separator (8) to the recycle ethylene holding drum (15); and
    a polyethylene discharge line (10) that is a line for discharging polyethylene separated by the low pressure separator (8).

3. The manufacturing apparatus according to claim 1, further comprising:
    an ethylene supply line (13) that is a line for connecting the booster stage of primary compressor (1) to the primary stage of primary compressor (2) and supplying compressed recycle ethylene from the booster stage of primary compressor (1) to the primary stage of primary compressor (2), and merging with an ethylene supply line (14); and
    the ethylene supply line (14) that is a line connected to the ethylene supply line (13) for supplying ethylene.

4. A method for manufacturing high-pressure method polyethylene, the method comprising:
    a low pressure recycle ethylene recycling step of supplying low pressure recycle ethylene separated by a low pressure separator (8) to a recycle ethylene holding drum (15) through a low pressure recycle ethylene line (9); and
    a chain transfer agent (CTA) supply step of supplying a chain transfer agent (CTA) from a chain transfer agent (CTA) supply line (17) to a low pressure recycle ethylene supply line (16).

5. The manufacturing method according to claim 4, wherein
    the low pressure recycle ethylene recycling step is a step of supplying low pressure recycle ethylene at a pressure of 0.01 to 0.1 MPa and a temperature of 150 to 220° C. separated by the low pressure separator (8) to the recycle ethylene holding drum (15) through the low pressure recycle ethylene line (9), and
    the chain transfer agent (CTA) supply step is a step of supplying a chain transfer agent (CTA) from the chain transfer agent (CTA) supply line (17), an inside of which is controlled to a pressure of 0.01 to 0.1 MPa and a temperature of 10 to 60° C., to the low pressure recycle ethylene supply line (16), an inside of which is controlled to a pressure of 0.01 to 0.1 MPa and a temperature of 10 to 60° C.

6. The manufacturing method according to claim 4, further comprising:
    a compression step of compressing ethylene;
    a reaction step of supplying compressed ethylene and a polymerization initiator to a reactor (4) to polymerize ethylene to generate polyethylene;
    a separation step of separating polyethylene generated in the reactor (4) and recycle ethylene from each other by a high pressure separator (5), discharging the generated polyethylene from the high pressure separator (5), supplying the polyethylene to a low pressure separator (8) through a discharge line (7), separating recycle ethylene contained in polyethylene from the polyethylene by the low pressure separator (8), and discharging the polyethylene;
    a low pressure recycle ethylene recycling step of supplying the low pressure recycle ethylene separated by the low pressure separator (8) to a booster stage of primary compressor (1) through a low pressure recycle ethylene line (9); and
    an ethylene supply step of supplying ethylene from an ethylene supply line (14) to an ethylene supply line (13).

7. The manufacturing method according to claim 6, wherein the compression step is
    a step of compressing ethylene to a pressure within a range of 0.04 MPa to 3 MPa by the booster stage of primary compressor (1), compressing ethylene compressed by the booster stage of primary compressor (1)

to a pressure within a range of 3 MPa to 20 MPa by a primary stage of primary compressor (2), and compressing ethylene compressed by the primary stage of primary compressor (2) to a pressure within a range of 20 MPa to 200 MPa by a secondary compressor (3).

8. The manufacturing method according to claim 4, wherein an apparatus for manufacturing high pressure method polyethylene is used.

\* \* \* \* \*